(12) United States Patent
Sundholm (10) Patent No.: US 12,398,821 B2
(45) Date of Patent: Aug. 26, 2025

(54) VALVE AND METHOD FOR CLEANING A VALVE

(71) Applicant: Maricap Oy, Vantaa (FI)

(72) Inventor: Göran Sundholm, Tuusula (FI)

(73) Assignee: Maricap Oy, Vantaa (FI)

( * ) Notice: Subject to any disclaimer, the term of this patent is extended or adjusted under 35 U.S.C. 154(b) by 0 days.

(21) Appl. No.: 18/000,978

(22) PCT Filed: Sep. 22, 2020

(86) PCT No.: PCT/FI2020/050611
§ 371 (c)(1),
(2) Date: Dec. 7, 2022

(87) PCT Pub. No.: WO2021/250309
PCT Pub. Date: Dec. 16, 2021

(65) Prior Publication Data
US 2023/0219119 A1    Jul. 13, 2023

(30) Foreign Application Priority Data

Jun. 12, 2020   (FI) ..................................... 20205608

(51) Int. Cl.
*F16K 27/04*      (2006.01)
*F16K 3/02*       (2006.01)
(Continued)

(52) U.S. Cl.
CPC .......... *F16K 27/044* (2013.01); *F16K 3/0281* (2013.01); *F16K 31/122* (2013.01); *B08B 3/02* (2013.01); *B08B 9/00* (2013.01)

(58) Field of Classification Search
CPC . F16K 3/02; F16K 3/0281; F16K 3/36; F16K 25/02; F16K 27/044; Y10T 137/043
See application file for complete search history.

(56) References Cited

U.S. PATENT DOCUMENTS

| 4,176,673 | A | 12/1979 | Connor |
| 4,938,250 | A | 7/1990 | Peterson |
| 8,534,309 | B2 * | 9/2013 | Metzger ................ F16K 27/044 |
| | | | 137/340 |

FOREIGN PATENT DOCUMENTS

| CN | 2690682 | 4/2005 |
| CN | 102149952 | 3/2013 |

(Continued)

OTHER PUBLICATIONS

English translation of WO00290804 (Year: 2024).*
(Continued)

*Primary Examiner* — Hailey K. Do
(74) *Attorney, Agent, or Firm* — DeLizio, Peacock, Lewin & Guerra LLP (57) ABSTRACT

A valve comprises a body (1), a closing member (2) movable in a space (11) between walls (9, 10) of the body transversely in relation to a flow passageway (3) through the body between at least two positions, a first position in which the flow passageway (3) is closed, and a second position in which the flow passageway is open, and an actuator (4) for moving the closing member (2) linearly between said at least two positions, which body (1) further comprises an edge part (12, 34). The valve comprises a cleaning arrangement in which an aperture (35, 36) is arranged in the valve body (1), located on the side of the closing member (2) actuator (4), and is configured to spray a cleaning medium into a part of the space located between walls (9, 10, 12, 34) of the space (11) and the closing member (2).

29 Claims, 8 Drawing Sheets

(51) Int. Cl.
*F16K 31/122* (2006.01)
*B08B 3/02* (2006.01)
*B08B 9/00* (2006.01)

(56) References Cited

FOREIGN PATENT DOCUMENTS

| | | | | |
|---|---|---|---|---|
| CN | 104074992 | 10/2014 | | |
| CN | 206 352 663 | 7/2017 | | |
| GB | 2584205 A | * 11/2020 | ............. | F16K 25/04 |
| JP | S62242184 | 10/1987 | | |
| JP | H06193770 | 7/1994 | | |
| JP | 2003205997 | 7/2003 | | |
| JP | 2004124997 | 4/2004 | | |
| JP | 2007298071 | 11/2011 | | |
| WO | WO-02090804 A2 | * 11/2002 | ........... | F16K 3/0254 |
| WO | 2007135237 | 11/2007 | | |
| WO | 2015173320 | 11/2015 | | |

OTHER PUBLICATIONS

FI Search Report for 20205608, Dec. 16, 2020, 2 pages.
International Search Report and Written Opinion, PCT Patent Application No. PCT/FI2020/050611, Dec. 7, 2020, 13 pages.
"Extended European Search Report for 20940345.0", May 31, 2024, 13 pages.
"CN Office Action", Jan. 27, 2025, 13 pages.

* cited by examiner

VALVE AND METHOD FOR CLEANING A VALVE

FIELD OF THE INVENTION

The invention relates to a valve and to a method for cleaning a valve.

BACKGROUND OF THE INVENTION

Valves specifically comprising a plate-type closing member have often problems with leak-proofness. Pressure from a medium possibly acting in a flow passageway causes, in a closed position of the valve, bending of the closing member and weakening of sealing, which leads for the part of certain media conducted along the flow passageway e.g. to fouling of guide and/or sealing surfaces of the valve body. This possibly hinders the movement of the closing member between an open position and a closed position. Further, dirt may in some applications cause problems in hygiene and leak-proofness. These problems have been attempted to be solved by means of different seal and/or valve structures. However, they have usually been complicated and have thus led to expensive solutions in terms of costs. From document WO2007/135237A1 a gate valve is known, which gate valve comprises a means arranged at an edge of the valve body for spraying a medium between walls of the body for keeping a lower part of a space between the walls clean and for thus improving the leak-proofness of the valve. This solution has provided considerable improvement to the valve fouling problems. It has been observed in some applications, however, that dirt/material hindering the operation of the valve may drift between the closing member of the valve and/or an actuating means thereof and the walls of the body. Such materials include for example plastic or glass or other hard objects which wear the parts of the valve and may cause malfunctions.

An object of this invention is to provide a completely novel solution for keeping a valve clean, by means of which the problems of the known solutions may be avoided. Another object of the invention is to provide a valve structure, the manufacturability of which is good and which is also easy in terms of assembly. Yet another object of the invention is to provide a sufficiently good solution in terms of leak-proofness.

SUMMARY OF THE INVENTION

The invention is based on an idea that a valve body is provided, at an end located on the side of an operating device, i.e. an actuator, with at least one aperture from which a medium, such as air, is blown. The air is blown when a closing member of the valve is moved in a space between walls of the body. The medium moves in the space between the closing member and the body and keeps clearances between the closing member and the body clean. According to an embodiment of the invention, an output of a medium operated actuator may be connected to be blown into the apertures formed in the valve body.

The valve according to the invention is primarily characterized by what is described in the characterizing part of claim 1.

The valve according to the embodiments of the invention is further characterized by what is described herein.

The method according to the invention is primarily characterized by what is described herein.

The method according to the embodiments of the invention is further characterized by what is described herein.

The solution according to the invention has many significant advantages. By arranging cleaning means in connection with the valve, accumulation of material transported in a flow passageway in the space between the walls of the body and the closing member or gate may be prevented, while at the same time preventing malfunctions attributable to fouling. By arranging a spraying aperture of a cleaning arrangement in the part of the valve body located on the side of the actuator, an efficient cleaning effect will be provided. By arranging a spraying aperture or spraying apertures of a cleaning arrangement in a channel in an edge part of the valve body, for example in a part of the body located opposite in relation to the actuator, an added cleaning effect will be provided. The clearances between the closing member and the valve body are maintained clean. At the same time, malfunctions of the closing member may be efficiently reduced. Problems in leak-proofness and hygiene of the valve are also efficiently reduced. By arranging means for delivering the medium to be synchronized according to the movements of the closing member, the cleaning of the closing member and valve body clearances may be enhanced. By arranging a control valve to control both of the operation of the closing member of the valve and the spraying of the medium, an efficient and affordable solution for controlling the valve cleaning arrangement is achieved. By arranging a pressure medium of a pressure medium operated actuator to operate as the medium in the cleaning arrangement, an efficient and affordable solution for a sprayable cleaning medium is provided. By arranging medium passages along which the medium is conducted to the actuator and from the actuator into the space of the valve body to be controlled in a synchronized manner by means of the control valve, a reliable, efficient and affordable arrangement for implementing the valve and the cleaning arrangement therefor is achieved. By providing the valve with a second cleaning arrangement, the cleaning of the space in the body may be further enhanced. By arranging the channel space needed for the cleaning in the edge of the valve body, a functionally and technically very advantageous structure is achieved. By using, as the edge part, a profile comprising support surfaces for the walls of the valve body, an advantageous construction in terms of assembly of the valve is also provided. By arranging the cleaning arrangement to comprise means to deliver the medium when the flow passageway of the valve is open, a well-timed and efficient cleaning operation is provided. The cleaning arrangement may comprise an arrangement which is independent of the control of the closing member, such as of the control valve of the actuator therefor, for delivering the cleaning medium, whereby a flexible solution for controlling the cleaning arrangement is achieved. The medium may be delivered into the space in the body from the aperture for a specific time period, a duration or frequency of which may be varied according to application and need. By conducting the cleaning medium from the space between the walls of the valve body to a partial-vacuum pipe, such as a conveying pipe of a partial-vacuum system, to which pipe the flow passageway of the valve is connected, an efficient solution for removing the cleaning medium and possible impurities is provided. By using gas, for example compressed air, as the medium, an efficient and affordable solution for the cleaning medium is provided. The medium may include liquid, if necessary. The valve according to the invention is excellent in terms of manufacturability. By using a plate-structured valve body and closing member, an easily modifiable structure for various applications may be provided.

LIST OF FIGURES

In the following section, the invention will be described in more detail by way of an example, with reference to the accompanying drawing, in which.

DETAILED DESCRIPTION OF THE INVENTION

Figure 1:
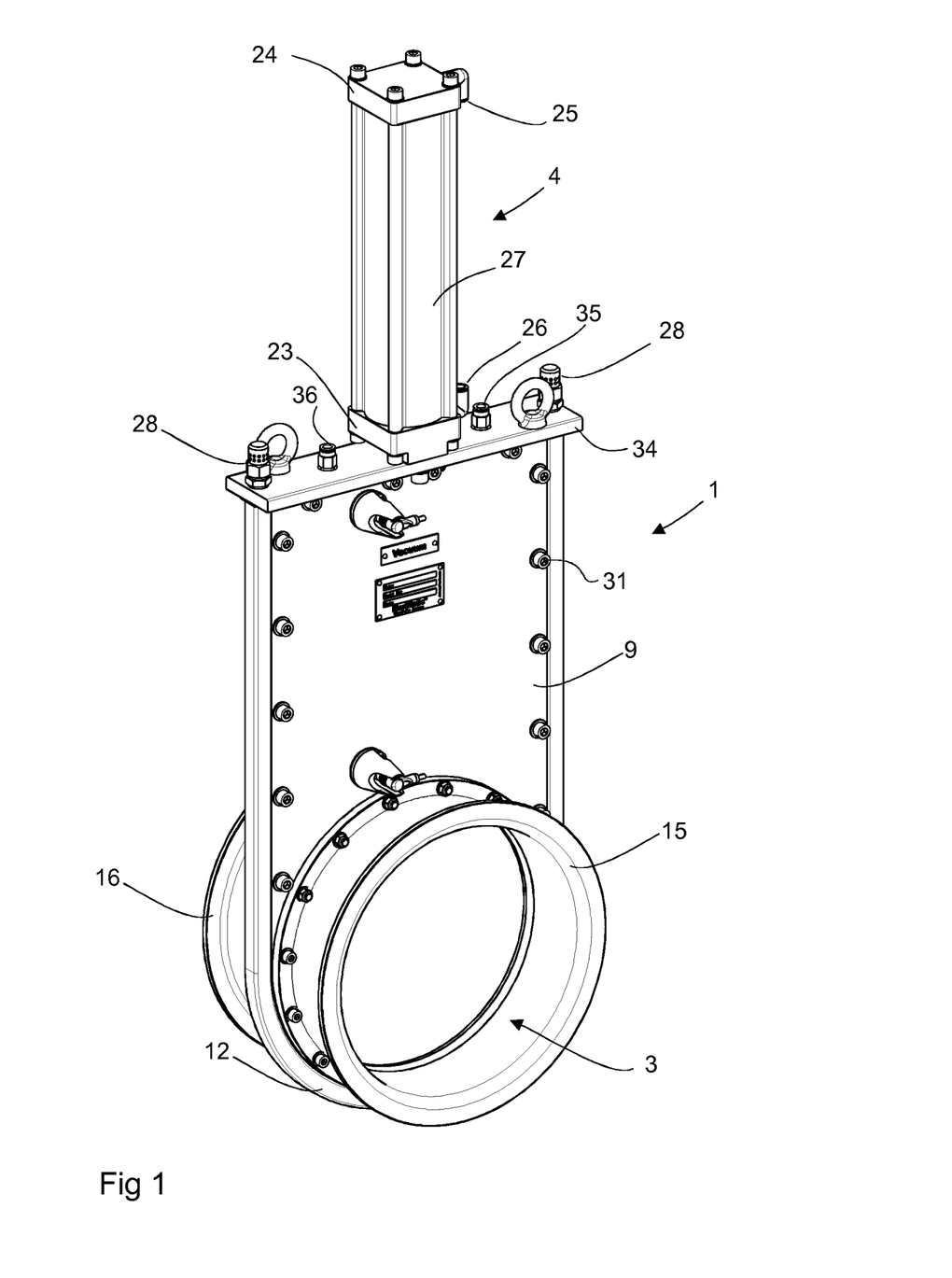
FIG. 1 illustrates one embodiment of a valve according to the invention.
Figure 2:
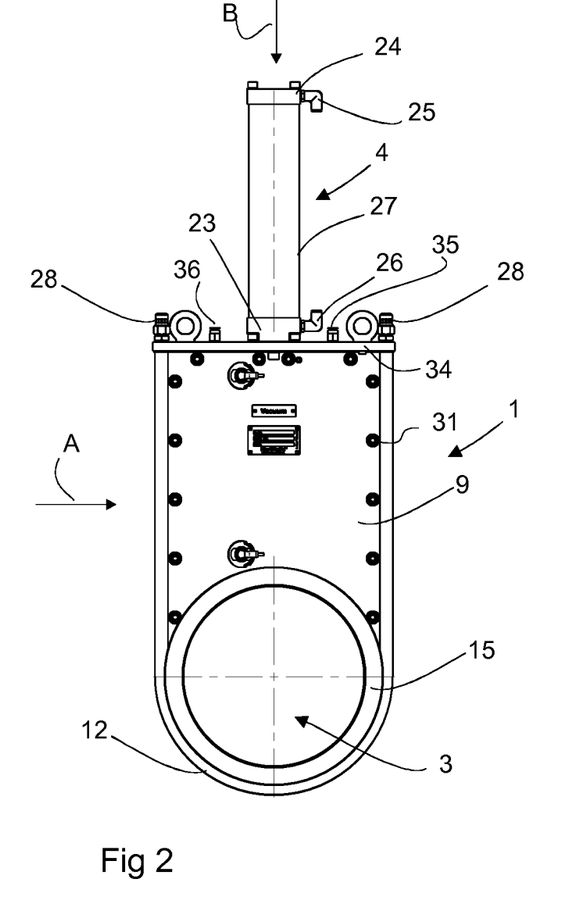
FIG. 2 illustrates one embodiment of a valve according to the invention as a front view.
Figure 3:
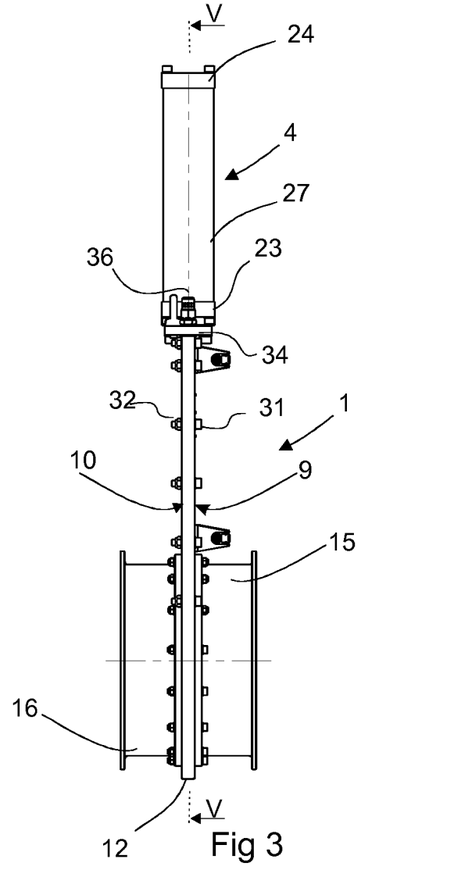
FIG. 3 illustrates one embodiment of a valve according to the invention from the direction of arrow A in FIG. 2.
Figure 4:
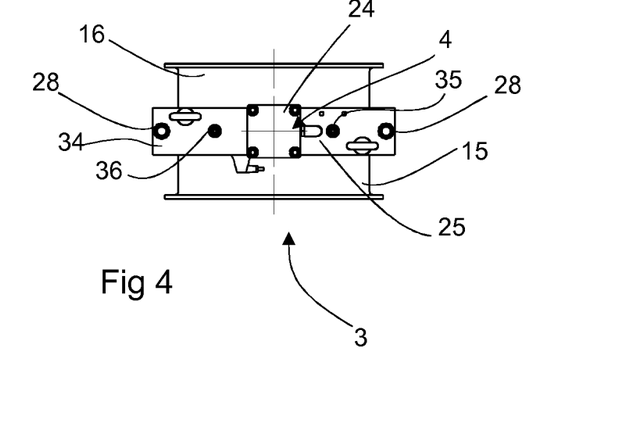
FIG. 4 illustrates one valve according to an embodiment of the invention from the direction of arrow B in FIG. 2.

FIG. 1 illustrates one first embodiment of a valve according to the invention as a perspective view.

The figures illustrate one embodiment of a valve according to the invention, specifically a gate valve, which comprises a body 1. Inside the body, a closing member 2 (illustrated in FIG. 5-7) is arranged, which closing member is movable in the body transversely in relation to a flow passageway 3 extending transversely through the body 1 between at least two positions, a first position in which the flow passageway 3 is closed, and a second position is which the flow passageway is open. The closing member may be formed from one part or it may include a gate part which is provided with a separate closing part. In the following, the term closing member will be used for the purpose of simplicity. The valve may also comprise an actuator 4 for moving the closing member 2 between said at least two positions. According to one embodiment, means for moving the closing member comprise an actuator 4 by means of which the closing member may be moved linearly between said two positions. According to one embodiment the closing member 2 may be a plate-type part. According to one embodiment, as in the figures, the flow passageway 3 may be provided through the valve body 1 via channel parts 15, 16 arranged in the valve body. The closing member 2 may be arranged to move by means of the actuator 4 between an upper position in which the flow passageway is open, and a lower position in which the flow passageway is closed. The closing member 2 may be arranged to move in a space 11 located between walls 9, 10 of the body. The surfaces of the walls 9, 10 facing each other may function as guide surfaces for the closing member. Between the channel parts 15, 16 of the flow passageway, i.e. in the wall of the flow passageway, a gap may be arranged, from which gap the closing member may move transversely in relation to the channel and extend in the first position to close the flow passageway. The closing member 2 extends in the first position outside the edges of a flow aperture of the flow channel, i.e. the flow passageway 3, away from the flow channel. In connection with a typically normal circular flow aperture in the cross-section of the flow passageway, the closing member 2 is thus larger than the diameter of the flow aperture of the flow passageway 3 at the intersection between the closing member 2 and the flow passageway 3.

The closing member may be according to one embodiment a plate-type part. The side edges of the closing member may be formed straight. The edge of an end portion of the closing member 2 facing away from the operating device, i.e. the actuator 4, may be curved so as to connect the opposite side edges of the closing member. The edge located opposite in relation to the curved edge, connecting the side edges at an end of the closing member located on the side of the actuator, may be formed straight or may comprise several straight portions. The closing member 2 may comprise a fastening point for the operating part of the actuator. The operating part of the actuator may be as in the embodiment of FIG. 5-7 a piston rod 21. Naturally, another shape for the closing member could also be considered depending on application.

The valve body 1 may comprise, as for example in the embodiments of FIG. 1-7, a first wall part 9 and a second wall part 10. The first wall part 9 and the second wall part 10 may be arranged at a distance from each other, whereby a space 11 is formed therebetween. The space 11 is delimited by the wall parts 9 and 10 and by an edge part 12, 34. There may be several edge parts, such as, for example, an edge part 12 and an upper edge part 34. According to one embodiment the closing member 2 is arranged movably in the space 11. The closing member 2 may be moved in the space 11 as in the embodiments of the figures by means of the actuator 4. The space 11 located in the body 1 extends transversely to a distance from the flow passageway 3, for example towards the actuator 4. The closing member 2 may be moved in the space 11 between a first position in which it closes the flow passageway 3, and a second position in which the flow passageway 3 through the valve is open. The actuator 4 may be fastened to the body 1. In one embodiment the actuator 4 may be arranged to the valve body 1, for example to the edge part thereof. According to one embodiment the actuator may be arranged to the valve body 1 at an opposite end as seen from the flow passageway 3, for example at the upper edge part 34. According to one embodiment the actuator 4 may be an actuator generating a linear movement. According to one embodiment the actuator may be a pressure medium operated cylinder-piston unit. The actuator 4 may comprise a cylinder which may have an elongated wall part 27 inside which a cylinder space 29 may be formed. The wall part 27 may be located between end parts 23 and 24 of the cylinder. The cylinder space 29 may be provided with a movable piston 22. The piston 22 may be provided with a piston rod 21 which may extend through an aperture formed in a first end part 23 of the cylinder and further through an aperture in the edge part 34 of the valve body into the space 11. The linear movement of the actuator 4 may be adjusted according to the linear movement required for the closing member 2 of the valve. The piston rod 21 of the actuator 4 may be, at an end located opposite in relation to the piston 22, arranged by means of fastening parts 20 to the closing member 2. The piston rod 21 may function as a valve stem which is connected by means of the fastening parts 20 to the closing member 2.

According to one embodiment the closing member 2 is a plate-type part. According to one embodiment the closing member 2 may be manufactured for example from a plate by punching or cutting, such as laser-cutting. Thereby a solution fulfilling sufficiently accurate dimensional tolerances may be achieved. Correspondingly according to one embodiment the wall parts 9, 10 of the body may be plate material and cut into shape, for example by laser-cutting.

According to one preferred embodiment the valve may further comprise means for cleaning at least part of the space 11 located between the walls 9, 10 of the valve body 1.

Typically the valve may comprise means for cleaning at least part of the space 11 located between the walls 9, 10 of the valve body 1 by spraying a medium.

Figure 5:
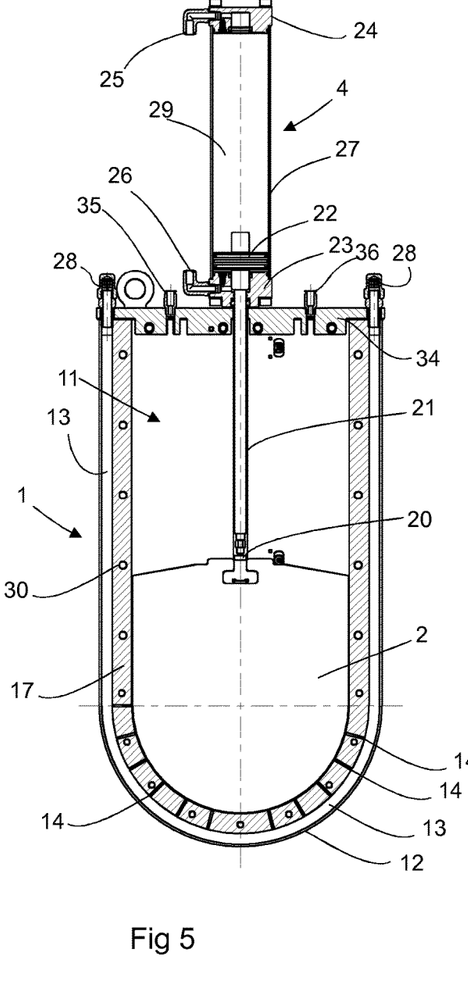
FIG. 5 illustrates one according to an embodiment of the invention as a partial cross-section along line V-V of FIG. 3 in a first operating position, a closing member in a lower position, i.e. a flow passageway being closed.
Figure 6:
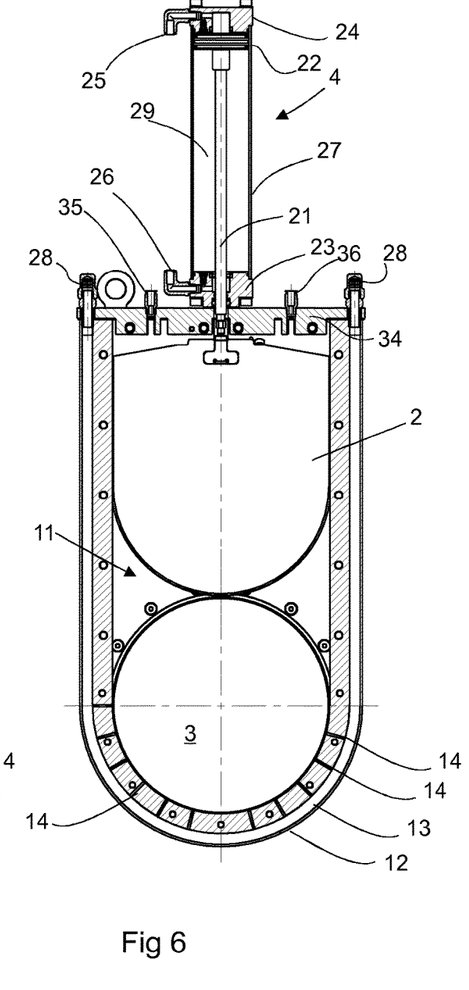
FIG. 6 illustrates the valve according to the embodiment of FIG. 5 as a partial cross-section in a second operating position, the closing member in an upper position, i.e. the flow passageway in an open position.

According to FIG. 5 the medium may be conducted via an inlet aperture 28 to a channel 13 in the edge part 12 and therefrom via apertures 14 into the space 11 between the walls 9, 10 of the body 1. According to one embodiment the apertures 14 may be arranged in the body 1 in proximity to the flow channel, i.e. the flow passageway 3, for example in that part of the space 11 to which the closing member 2 should extend in a closed position. According to one embodiment, especially when the valve is arranged as a closing member in a partial-vacuum pipe, such as a pipe of a partial-vacuum conveying system, a negative pressure may act in the flow passageway 3, whereby via the inlet apertures 28, air is able to access the channel 13 under normal pressure and which further is sprayed via the apertures 14 into the space 11.

The body 1 may comprise an edge part 12, 34 connecting the side walls 9, 10. According to one embodiment the edge part may be provided with a channel space 13. In the edge part 12, 34 there may be at least one aperture 14, 35, 36, preferably several apertures, which opens into the space 11 between the first wall part 9 and the second wall part 10 for conducting the medium into the space. According to one embodiment of the invention the body 1 may be formed by connecting the wall parts 9, 10 with the edge part 12, 34, for example by fastening means 31, 32 or by welding. A channel part 15 may be connected to the first wall part 9 by fastening means or for example by welding. Correspondingly a channel part 16 is connected to the second wall part 10 by fastening means or for example by welding. In the wall parts 9, 10, the flow aperture 3 may be formed. Between the wall parts there is a space 11 for the closing member 2. The plate-structured valve according to the embodiment is, for example as opposed to cast-structured valve solutions, very affordable and easy to manufacture especially with smaller production runs.

In the embodiment according to the figures the edge part 12 may be formed from a profile having a channel section and a support section 17. The channel section may comprise a channel 13. The support section 17 is preferably thinner in a cross direction than the channel section. The support section 17 of the edge part may form a support surface for the walls 9, 10 of the valve body.

The walls 9, 10 may be arranged by the fastening means 31, 32 to the support part 17 of the edge part 12. Thereby the support section 17 is provided between the walls 9, 10. In the support section 17 and in the corresponding parts of the walls 9, 10, apertures 30 may be formed, through which apertures a screw part of a screw member 31 functioning as a fastening means may extend and from the opposite side by a counterpart means, such as a nut means 32, the walls 9, 10 may be tightened against the support section 17. The support section 17 may be in its thickness somewhat larger than the thickness of the closing member.

The channel part may be in the embodiment according to the figures arranged outside the outer edge of the walls 9, 10. According to another embodiment the channel part may be arranged between the walls.

The valve according to the invention may comprise a cleaning arrangement in which an aperture 35, 36 for conducting a medium is arranged to the body 1, to a part of the body 1 located on the side of the closing member 2 actuator 4. In the arrangement the aperture may be configured to spray a cleaning medium into a part of the space located between walls 9, 10, 12, 34 of the space 11 and the closing member 2. The medium may move in the space between the closing member 2 and the body, removing impurities and debris from the space.

According to one embodiment the cleaning arrangement may comprise means for delivering the medium into the space 11 between the walls of the valve body in a synchronized manner according to the movement of the closing member 2.

According to one embodiment the cleaning arrangement may comprise a control valve 42 for opening or closing or switching a medium passage 35', 36' to the space 11. The medium may be output by means of a pump device, for example a compressor, from which a passage to the valve 1 may be arranged.

According to one embodiment the closing member 2 actuator 4 is a pressure medium operated cylinder-piston combination, and the pressure medium of which is arranged to be conducted into the space 11 of the valve for cleaning it.

According to one embodiment the actuator 4 may be arranged to be controlled by a control valve 42. According to one embodiment, by means of the control valve the opening or closing or switching of the medium passages 35', 36' in the cleaning arrangement may also be controlled.

Figure 7:
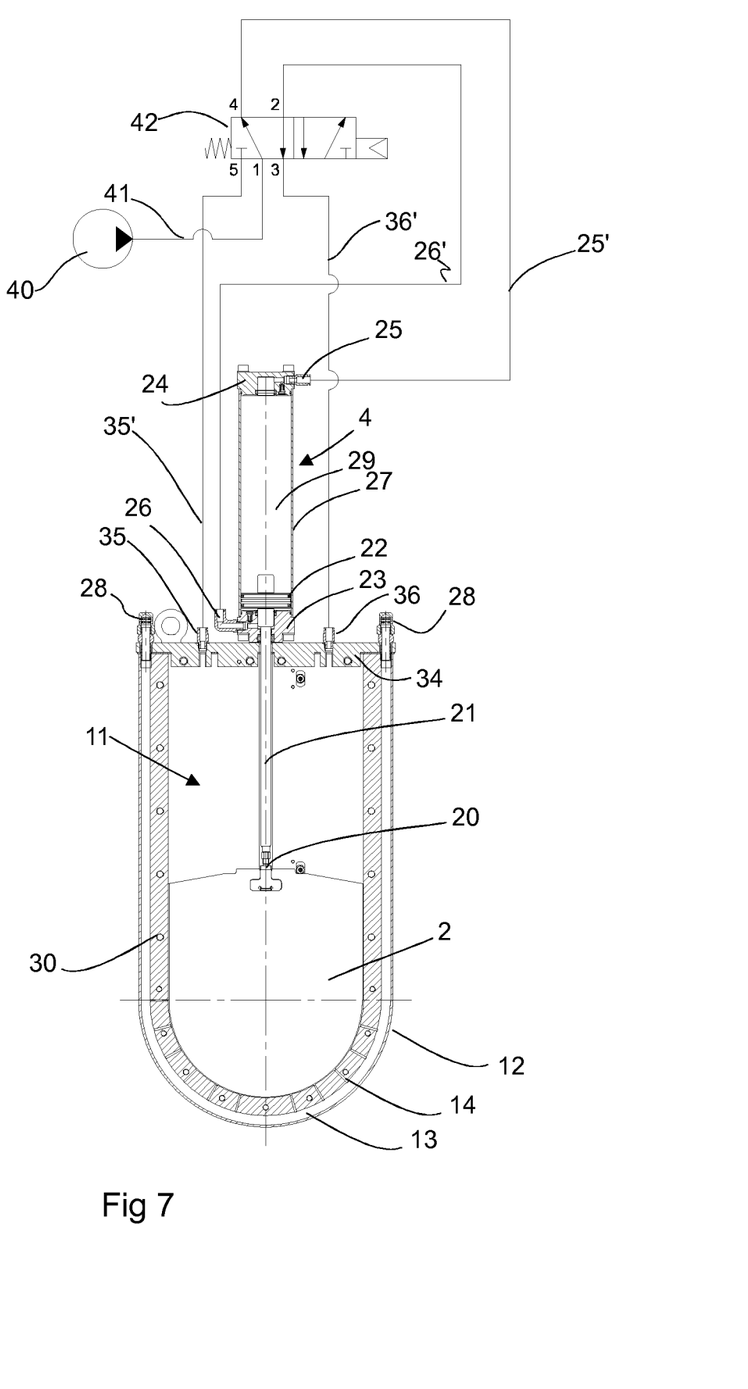
FIG. 7 illustrates a solution according to one embodiment of the invention as a partial cross-section and a simplified schematical view.
Figure 7A:
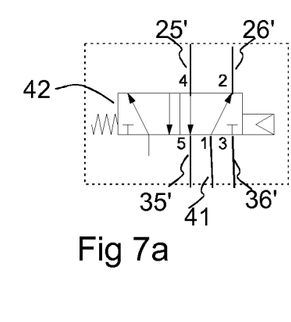
FIG. 7a shows a further detail of a control valve for a valve of the embodiment of FIG. 7 in a second operating position.

FIGS. 7 and 7a illustrate one embodiment of a control valve 42 arranged to control the closing member 2 actuator 4 of the valve as well as the delivery of the cleaning medium into the space 11 of the valve body.

According to one embodiment the cleaning arrangement may comprise a first medium passage 35' from a first side of a piston 22 of the closing member actuator 4 to an aperture 35 opening into the space 11 between the walls 9, 10 of the valve body 1. The embodiment may also comprise one second medium passage 36' from a second side of the piston 22 of the closing member 2 actuator 4 to an aperture 36 opening into the space 11 between the walls 9, 10 of the valve body 1. According to one embodiment the first passage 35' may be open for conducting the medium into the space 11 between the walls of the body when the closing member 2 of the valve is moved from the first position to the second position. According to one embodiment, correspondingly the second medium passage 36' is open when the closing member 2 is moved from the second position to the first position. Then an operating medium of the actuator 4 may be conducted into the space 11 between the walls of the valve body. According to one embodiment the cleaning arrangement may comprise a control valve 42 for opening and closing said passages.

In FIGS. 7 and 7a the cleaning arrangement may comprise a pressure source, such as a pump device 40, for example a compressor. From the pressure source 40 there is a passage 41 to the control valve 42. In the embodiment of the control valve 42 there may be several positions by means of which a connection from the pressure source may be opened and closed. The pressure medium may then be directed to different passages. In the situation of FIG. 7 the pressure medium is conducted in the first position of the valve to the valve and therefrom along a first passage 25' to a port 25 in the upper part of the actuator, which port is arranged to a second end part 24 of the cylinder part of the cylinder-piston combination operating as the actuator. The second end part 24 is in FIG. 7 an end part of the actuator facing away from the closing member 2. From the port 25 in the upper part the pressure medium may be conducted into the cylinder space 29 above the piston 22, i.e. to a side located away from the piston rod 21 and the closing member 2. The effect of the pressure medium then displaces the piston downwardly in the figure in the cylinder space and displaces the piston rod outwardly from the lower part of the actuator, from the first end part 23, whereby the closing member 2 arranged to the piston rod 21, at an opposite end in relation to the piston 22, moves to the lower position, i.e. closes the flow passageway 3. When the piston moves downwardly in the cylinder space 29 it may at the same time force in the cylinder space 29 the pressure medium disposed in a part of the space located between the piston 22 and the lower, first end part 23 of the cylinder out from a second port 26 along a passage 26'. The control valve 42 has in this position connected the passage 26' to lead to the passage 36' and further via the aperture 36 arranged in the valve body 1 to the part of the valve space 11 located between the closing member upper edge part 34 and edge part 12. Thus the piston 22 of the actuator 4 forces the medium under pressure via passages 26, 26', 36', 36 into the space 11. This efficiently cleans impurities off the space 11. In the embodiment of FIG. 7 the second passage 35' to the space 11 via the aperture 35 may be closed in the position of the valve.

FIG. 7a shows a detail of a control valve 42 of one embodiment in the second position. In this position the pressure medium is conducted along the passage 41 in the second position of the valve to the valve 42 and therefrom along the second passage 26' to the port 26 in the lower part of the actuator, which port is arranged to the first end part 23 of the cylinder part of the cylinder-piston combination operating as the actuator. The first end part 23 is in FIG. 7 an end part of the actuator 4 located on the side of the closing member. From the port 26 in the lower part the pressure medium may be conducted into the cylinder space 29 below the piston 22, i.e. to the side of the piston rod 21 and the closing member 2. The effect of the pressure medium then displaces the piston upwardly from the position of FIG. 7 in the cylinder space and displaces the piston rod inwardly from the lower part of the actuator, from the first end part 23, whereby the closing member arranged to the piston rod 21, at an opposite end in relation to the piston, moves to the second position, the upper position, i.e. opens the passage 3. When the piston moves upwardly in the cylinder space 29 it may at the same time force in the cylinder space 29 the pressure medium disposed in a part of the space located between the piston 22 and the upper, second end part 24 of the cylinder out from the second port 25 along the passage 25'. The control valve 42 has in this position connected the passage 25' to lead to the passage 35' and further via the aperture 35 arranged in the valve body 1 to the part of the valve space 11 located between the closing member upper edge part 34 and edge part 12. Thus the piston 22 of the actuator 4 forces the medium under pressure via passages 25, 25', 35', 35 into the space 11. This efficiently cleans impurities off the space 11. In the embodiment of FIG. 7a the second passage 36' to the space 11 via the aperture 36 may be closed in the position of the valve. The example of the figure is one way to implement the spraying of the pressure medium in the cleaning arrangement by means of the actuator. Further, in the cleaning arrangement the spraying of the medium can be synchronized to the movements of the closing member.

The valve may further comprise second means 14, 28 for conducting a medium at least into a lower part of the space 11 located between the walls 9, 10 of the body, whereby the edge part 12 of the valve is provided with a channel 13, from which channel there is at least one aperture 14, preferably several apertures, which opens into the space 11 between the walls of the body, preferably into a part of the space 11 located opposite in relation to the actuator 4, for conducting the medium by means of a negative pressure into the space, the negative pressure acting in the space 11, and in which channel 13 there is at least one inlet aperture 28 opening to ambient pressure. In the second arrangement, air is conducted from standard atmosphere via the inlet aperture 28 into the channel 13 and further via the aperture 14 into the space 11. When the valve is arranged at the flow passageway 3 thereof in a partial-vacuum pipe and the valve is opened, the air may move due to a pressure difference via the aperture 14, further via the flow passageway 3, into a conveying pipe to which the valve 1 may be connected.

Figure 8:
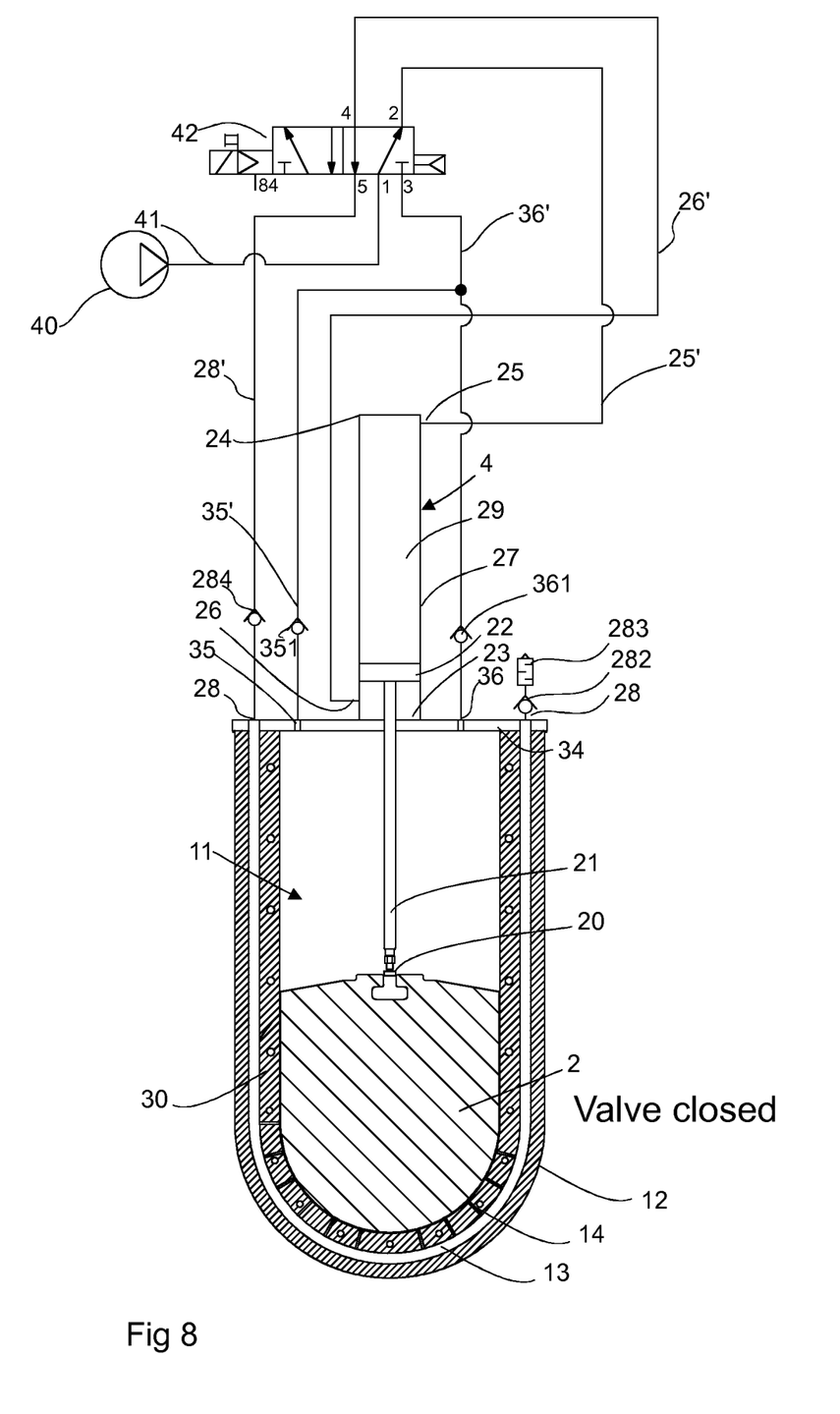
FIG. 8 illustrates a solution according to one embodiment of the invention as a partial cross-section and a simplified schematical view with a closing member in a first position.

FIG. 8-11 illustrate yet one embodiment. In the embodiment of the figures a passage 28' may be arranged from the first side of the piston 22 of the closing member actuator 4 via the inlet aperture 28 to the channel 13 in the edge part 12. Then the medium may be conducted into the channel 13 in the edge part 12 and therefrom via the apertures 14 into the space 11 between the walls 9, 10 of the body 1. When the piston moves downwardly in the cylinder space 29 it may at the same time force in the cylinder space 29 the pressure medium disposed in the part of the space between the piston 22 and the lower, first end part 23 of the cylinder out from the second port 26 along the passage 26'. The control valve 42 has in this position connected the passage 26' to lead to the passage 28' and further to the channel 13 and therefrom via the apertures 14 to the space 11 between the walls 9, 10 of the body 1. Thus the piston 22 of the actuator 4 forces the medium under pressure via passages 26, 26', 28', 13 and the apertures 14 into the space 11. This efficiently cleans impurities off the space 11, for example the lower part thereof. In the embodiment of FIG. 8, one or more passages 35', 36' to the space 11 via the aperture 35 and/or aperture 36 may be closed in the position of the valve. In the embodiment of FIG. 8-11, at least one aperture 35, 36 is formed in the upper part of the valve body, which aperture or the passage 35', 36' leading to which aperture may be provided with a check valve 351, 361. According to one embodiment the check valve may allow the flow along the passage towards the valve space 11 but close the passage from the valve space in the opposite direction.

According to one embodiment the channel 13 may comprise a first inlet aperture 28 to which the medium passage 28' may be connected, and a second inlet aperture 28 which may open to ambient pressure. According to one embodiment, in connection with the second inlet aperture 28 of the channel 13, a check valve 282 may be arranged. The check valve 282 may according to one embodiment allow the flow from outside of the valve body into the channel 13 but prevent the flow from the channel 13 in the opposite direction. According to one embodiment, in connection with the second inlet aperture, a silencer 283 may be arranged.

Figure 9:
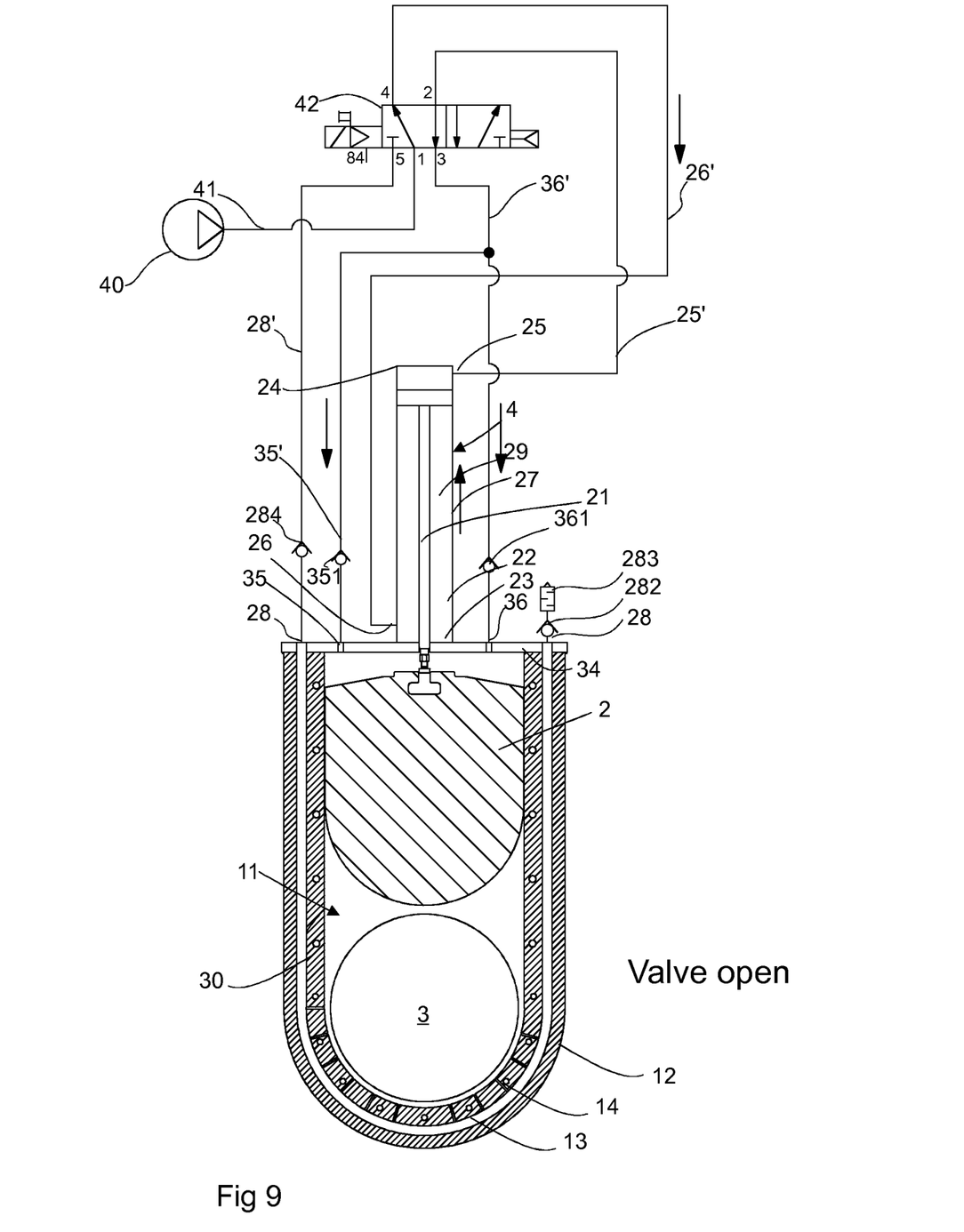
FIG. 9 illustrates a solution according to one embodiment of the invention as a partial cross-section and a simplified schematical view with a closing member in a second position.

According to one embodiment the arrangement may also comprise one second medium passage 36' from the second side of the piston 22 of the closing member 2 actuator 4 to one or more apertures 35, 36 opening into the space 11 between the walls 9, 10 of the valve body 1. According to one embodiment the first passage 35' may be connected to the second medium passage 36', whereby the second passage branches into two passages. Thereby the first and the second medium passages 35', 36' may be open for conducting the medium from the apertures 35, 36 into the space 11 between the walls of the body when the closing member 2 of the valve is moved from the first position to the second position. Thereby the operating medium of the actuator 4 may be conducted into the space 11 between the walls of the valve body. One embodiment of this is illustrated in FIG. 9. According to one embodiment the connection via the passage 28' to the channel 13 may thereby be closed. According to one embodiment the cleaning arrangement may comprise a control valve 42 for opening and closing said passages and for connecting a pressure medium source, such as a compressor, to act in different inlets of the actuator 4 via the medium passages 25' or 26'.

Figure 10:
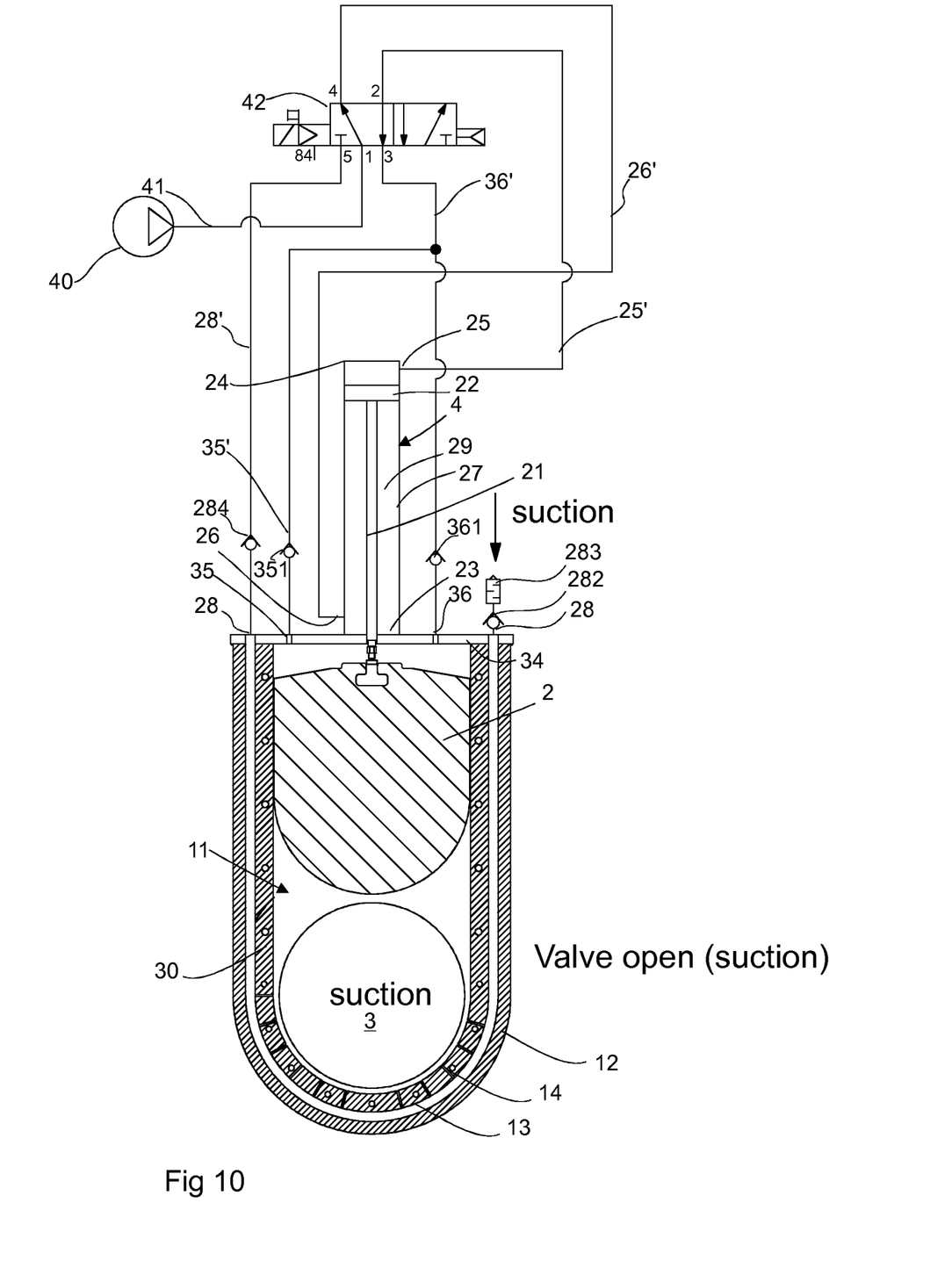
FIG. 10 illustrates a solution according to one embodiment of the invention as a partial cross-section and a simplified schematical view with a closing member in a second position and in an operating state in which a suction acts from a flow passageway.

According to one embodiment, as in FIG. 10, while a suction acts in the flow passageway 3, air may be conducted from a higher ambient pressure via the aperture 28 and from the channel 13 via the apertures 14. Thus, air may flow due to the suction from the environment through the silencer 283 and the check valve 282 further to the aperture 28 and into the channel. From the channel 13 via the apertures 14 into the space 11 and further to the flow passageway 3. Thereby, via the inlet aperture 28, air is able to access the channel 13 under standard pressure and which further is sprayed via the apertures 14 into the space 11. The valve 42 may have closed the channel 28'.

Figure 11:
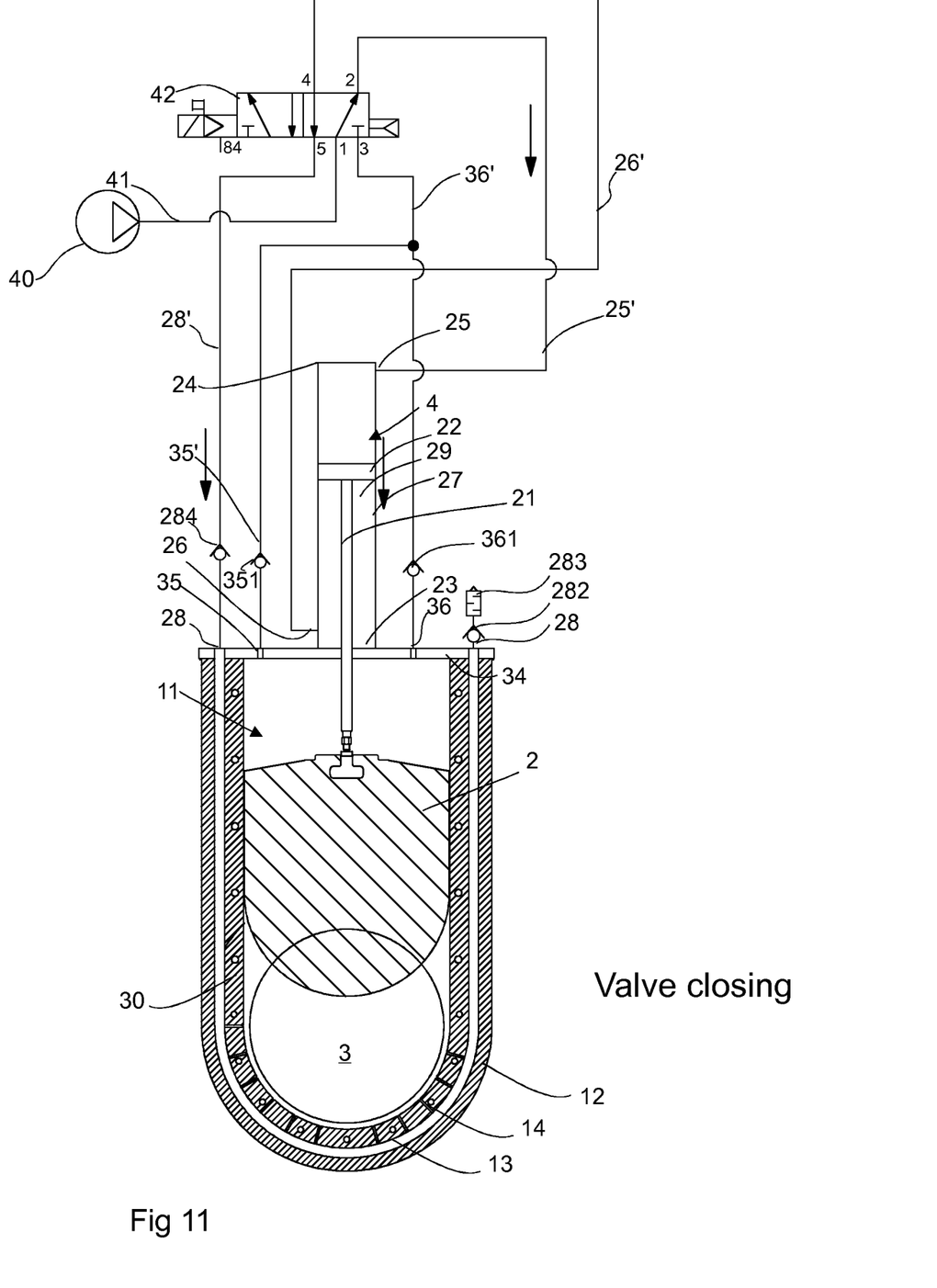
FIG. 11 illustrates a solution according to one embodiment of the invention as a partial cross-section and a simplified schematical view with a closing member moving from a second position to a first position.

According to one embodiment, as in FIG. 11, when the closing member 2 is moved from the second position to the first position, a connection from the pressure medium source, such as the compressor 40, is opened from the passage 41 a connection to the passage 25'. Thereby, from the port 25 in the upper part of the cylinder, the pressure medium may be conducted into the cylinder space 29 above the piston 22, i.e. to the side located away from the piston rod 21 and the closing member 2. The effect of the pressure medium then displaces the piston downwardly in the figure in the cylinder space and displaces the piston rod outwardly from the lower part of the actuator, from the first end part 23, whereby the closing member 2 arranged to the piston rod 21, at an opposite end in relation to the piston 22, moves to the lower position, i.e. closes the flow passageway 3. When the piston moves downwardly in the cylinder space 29 it may at the same time force in the cylinder space 29 the pressure medium disposed in the part of the space located between the piston 22 and the lower, first end part 23 of the cylinder out from the second port 26 along the passage 26'. Then, by means of the control valve 42, the passage 26' may be connected to lead to the passage 28' and further to the channel 13 and therefrom via the apertures 14 into the space 11 between the walls 9, 10 of the body 1. Then the piston 22 of the actuator 4 may force the medium under pressure via the passages 26, 26', 28', 13 and the apertures 14 into the space 11. This efficiently cleans impurities off the space 11, for example the lower part thereof. Then the sealing surfaces between the closing member and the body are cleaned and leak-proofness of the valve is kept good. According to one embodiment the opposite end of the channel 13 may be provided with a check valve 282 which may prevent the medium conducted under pressure from flowing out from the channel 13 from the opposite end thereof.

The closing member 2 having returned from the embodiment of FIG. 11 to the first position according to the embodiment of FIG. 8 closes the flow channel 3 of the valve. In the embodiments of FIG. 8-11, a check valve 284, 351, 361 may be arranged in connection with the passages 28', 35', 36'.

According to one embodiment the cleaning arrangement comprises means for delivering the medium into the space 11 between the walls of the valve body when the flow passageway 3 of the valve is open.

According to one embodiment the cleaning arrangement comprises a control which is independent of the control valve 42 of the closing member 2 actuator 4.

The described arrangements efficiently support each other and the valve space 11 may be efficiently kept clean and the valve be kept operational by means of the arrangements.

According to one embodiment the invention may also relate to a method for cleaning a valve, which valve comprises a body 1, a closing member 2 movable in a space 11 between walls 9, 10 of the body transversely in relation to a flow passageway 3 provided through the body between at least two positions, a first position in which the flow passageway 3 is closed, and a second position in which the flow passageway is open, and an actuator 4 for moving the closing member 2 linearly between said at least two positions, which body 1 comprises an edge part 12, 34. According to one embodiment, in the method, a cleaning medium is delivered via an aperture 35, 36 arranged in the valve body 1, in a part of the body 1 located on the side of the closing member 2 actuator 4, and the cleaning medium is sprayed into a part of the space located between walls 9, 10, 12, 34 of the space 11 and the closing member 2.

According to one embodiment, in the method, the medium is delivered into the space 11 between the walls of the valve body in a synchronized manner according to the movement of the closing member 2.

According to one embodiment, in the method, a medium passage to the space 11 is opened or closed or switched by means of a control valve 42.

According to one embodiment, in the method, the closing member 2 actuator 4 is a pressure medium operated cylinder-piston combination, the pressure medium of which is conducted into the valve space 11 for cleaning it.

According to one embodiment the medium is delivered via a medium passage into the space 11 between the walls of the body when the closing member of the valve is moved from the first position to the second position and when the closing member is moved from the second position to the first position.

According to one embodiment, in the method, the medium is delivered via a first medium passage 35' into the space 11 between the walls 9, 10 of the valve body 1 and via one second medium passage 36' into the space between the walls 9, 10 of the valve body 1, and that the medium is delivered via the first passage 35' into the space 11 between the walls of the body when the closing member 2 of the valve is moved from the first position to the second position and via the second medium passage 36' when the closing member is moved from the second position to the first position.

According to one embodiment an operating medium of the closing member 2 actuator 4 is used as the medium.

According to one embodiment the operating medium of the actuator 4 is conducted from the actuator via the first medium passage 35' or the second medium passage 36' into the space 11 between the walls of the valve body.

According to one embodiment the medium is conducted into the space between the walls of the valve body 1 along a medium passage 35', 36', the aperture 35, 36 of which into the space 11 between the walls of the valve body is arranged in the valve body 1, in the part located on the side of the closing member 2 actuator 4.

According to one embodiment the medium is gas, for example compressed air.

According to one embodiment the medium may include liquid.

According to one embodiment the medium is delivered into the space 11 between the walls of the body, into the space between the walls and the closing member, from the aperture 35, 36 formed in a wall 34 in the part of the body located on the side of the actuator.

According to one embodiment the medium is delivered by blowing.

According to one embodiment said medium or other medium is delivered from an aperture 14 or apertures formed in an edge part 12 of the valve body 1, which aperture opens into the space 11 between the walls of the body for conducting the medium by means of pressure into the space. According to one embodiment the edge part 12 of the valve is provided with a channel 13, from which channel there is at least one aperture 14, preferably several apertures, which opens into the space 11 between the walls of the body, preferably into a part of the space 11 located opposite in relation to the actuator 4, and in which channel 13 there is at least one inlet aperture 28 to which the medium is conducted along a passage 28'.

According to one embodiment the medium is delivered via the passage 28', the channel 13 and the aperture 14 in the channel into the space 11 between the walls of the body when the closing member 2 of the valve is moved from the second position to the first position or when the closing member 2 of the valve is moved from the first position to the second position.

According to one embodiment said medium or other medium is further delivered from the aperture 14 or apertures formed in the edge part 12 of the valve body 1, which aperture opens into the space 11 between the walls of the body for conducting the medium by means of a negative pressure into the space, the negative pressure acting in the space 11, whereby the edge part 12 of the valve is provided with a channel 13, from which channel there is at least one aperture 14, preferably several apertures, which opens into the space 11 between the walls of the body, preferably into the part of the space 11 located opposite in relation to the actuator 4, and in which channel 13 there is at least one inlet aperture 28 opening to ambient pressure.

According to one embodiment, in the method, the cleaning medium is conducted from the space 11 between the walls of the valve body to a partial-vacuum pipe, such as a conveying pipe of a partial-vacuum system, to which pipe the flow passageway 3 of the valve is connected.

According to one embodiment the operations provided by the control valve 42 may also be arranged by other means, for example by means of several valves. According to one embodiment, for example the blowing of the medium in the cleaning arrangement may be provided by means of a control valve which is independent of the control of the closing member 2 actuator 4. According to one embodiment the blowing of the medium may be adjusted by time. According to one embodiment the medium is delivered when the flow passageway of the valve is open or partly open, for example when the closing member is moved from the first position to the second position or when it is in the second position. According to one embodiment the medium is delivered for a specific time when the flow passageway of the valve is open or partly open, for example for 1-10 seconds, preferably for 2-8 seconds, most preferably for 3-6 seconds. The control valve illustrated in FIGS. 7 and 7*a* is a 5/2-way valve, which may according to one embodiment be a pilot-operated spring-loaded valve. The control of the valve and of the control valve may be implemented in various ways depending on application. In a 5/2-way valve the first number 5 indicates the number of ports and the second number 2 indicates the number of positions of the valve.

It is obvious to a person skilled in the art that the invention is not limited to the above-described embodiments, but it may be modified within the scope of the accompanying claims. The features possibly presented in combination with other features in the description may also be applied separately, if needed.

The invention claimed is:

1. A valve which comprises:
    a valve body;
    a closing member movable in a space between walls of the valve body transversely in relation to a flow passageway provided through the valve body between at least two positions, a first position in which the flow passageway is closed, and a second position in which the flow passageway is open;
    an actuator for moving the closing member linearly between said at least two positions, wherein the valve body further comprises an edge part connecting the walls, characterized in that the valve comprises a cleaning arrangement in which an aperture for conducting a medium is arranged in the valve body, in a part of the valve body located on a side of the actuator for moving the closing member, and is configured to spray a cleaning medium into a part of the space located between the walls of the valve body and the closing member; and
    means for conducting the medium at least into a lower part of the space located between the walls of the valve body, wherein the edge part of the valve is provided with a channel, from which channel there is at least one aperture which opens into the space between the walls of the valve body for conducting the medium by means of a negative pressure into the space, the negative pressure acting in the space, and in which channel there is at least one inlet aperture opening to ambient pressure.

2. The valve according to claim 1, wherein the cleaning arrangement comprises means for delivering the medium into the space between the walls of the valve body in a synchronized manner according to movement of the closing member.

3. The valve according to claim 1, wherein the cleaning arrangement comprises a control valve for opening or closing or switching at least one medium passage to the space.

4. The valve according to claim 1, wherein the closing member is a pressure medium operated cylinder-piston combination, and the pressure medium of which is arranged to be conducted into the space for cleaning the valve.

5. The valve according to claim 1, wherein the actuator is arranged to be controlled by means of a control valve by which the opening or closing or switching of medium passages of the cleaning arrangement are also controlled.

6. The valve according to claim 1, wherein the cleaning arrangement comprises means for delivering the medium into the space between the walls of the valve body when the flow passageway of the valve is open.

7. The valve according to claim 1, wherein the cleaning arrangement comprises a control which is independent of a control valve of the closing member.

8. The valve according to claim 1, wherein the cleaning arrangement comprises a first medium passage from a first side of a piston of the closing member to a first aperture opening into the space between the walls of the valve body, and a second medium passage from a second side of the piston of the closing member to a second aperture opening into the space between the walls of the valve body, and that the first medium passage is open for conducting the medium into the space between the walls of the valve body when the closing member of the valve is moved from the first position to the second position, and correspondingly the second medium passage is open when the closing member is moved from the second position to the first position, for conducting an operating medium of the actuator into the space between the walls of the valve body, and which cleaning arrangement comprises a control valve for opening and closing the first medium passage and the second medium passage.

9. The valve according to claim 8, further comprising:
a medium passage to the channel arranged in the edge part of the valve and the medium passage is open for conducting the medium into the space between the walls of the valve body when the closing member of the valve is moved from the second position to the first position, and correspondingly at least one of the first medium passage and the second medium passage is open for conducting the medium via at least one aperture into the part of the space of the valve body located on the side of the closing member when the closing member is moved from the first position to the second position, and that the medium is the operating medium of the actuator, and that the cleaning arrangement comprises the control valve for opening and closing the first medium passage and the second medium passage.

10. The valve according to claim 9, wherein a check valve is arranged in connection with the at least one inlet aperture of the channel.

11. A method comprising:
cleaning a valve that comprises a valve body, a closing member movable in a space between walls of the valve body transversely in relation to a flow passageway provided through the valve body between at least two positions, a first position in which the flow passageway is closed, and a second position in which the flow passageway is open, wherein the cleaning of the valve comprises,
moving, using an actuator, the closing member linearly between said at least two positions, wherein the valve body comprises an edge part,
delivering a cleaning medium is via an aperture arranged in the valve body, in a part of the valve body located on a side of the actuator for moving the closing member; and
spraying the cleaning medium into a part of the space located between walls of the valve body and the closing member;
wherein said cleaning medium or other medium is further delivered from the aperture or apertures formed in the edge part of the valve body, which the aperture opens into the space between the walls of the valve body for conducting the cleaning medium by means of a negative pressure into the space, the negative pressure acting in the space, whereby the edge part of the valve is provided with a channel, from which channel there is at least one aperture, which opens into the space between the walls of the valve body, into the part of the space located opposite in relation to the actuator, and in which channel there is at least one inlet aperture opening to ambient pressure.

12. The method according to claim 11, wherein a medium passage to the space is opened or closed or switched by means of a control valve.

13. The method according to claim 11, wherein delivering the cleaning medium comprises delivering the cleaning medium via a medium passage into the space between the walls of the valve body when either the closing member is moved from the first position to the second position or when the closing member is moved from the second position to the first position.

14. The method according to claim 11, wherein the cleaning medium is conducted into the space between the walls of the valve body along a medium passage, the aperture of which into the space between the walls of the valve body is arranged in the valve body, in the part located on the side of the closing member.

15. The method according to claim 11, wherein the cleaning medium is gas.

16. The method according to claim 11, wherein the cleaning medium includes liquid.

17. The method according to claim 11, wherein the cleaning medium is delivered into the space between the walls of the valve body, into the space between the walls and the closing member, from the aperture formed in a wall in the part of the valve body located on the side of the actuator.

18. The method according to claim 11, wherein the cleaning medium is delivered by blowing.

19. The method according to claim 11, wherein in the method, the cleaning medium is conducted from the space between the walls of the valve body to a partial-vacuum pipe to which pipe the flow passageway of the valve is connected, wherein the partial vacuum pipe is a conveying pipe of a partial vacuum system.

20. The method according to claim 11, wherein the cleaning medium is delivered independently of a control of the actuator.

21. The method according to claim 11, wherein the cleaning medium is delivered from an aperture opening into the space between the walls of the valve body, into the part of the space located opposite in relation to the actuator, and/or from an aperture opening into the space between the walls of the valve body, into the part of the space located on the side of the actuator, when the flow passageway of the valve is at least partly open.

22. The method according to claim 11, wherein the cleaning medium is delivered from the aperture for a specific time period, wherein the specific time period is one of 1-10 seconds, 2-8 seconds, or 3-6 seconds.

23. The method according to claim 11, wherein delivering the cleaning medium comprises delivering the cleaning medium into the space between the walls of the valve body in a synchronized manner according to the movement of the closing member.

24. The method according to claim 23, wherein the closing member is a pressure medium operated cylinder-piston combination, the pressure medium of which is conducted into the space for cleaning the valve.

25. The method according to claim 11, wherein said cleaning medium or other medium is delivered from the aperture or apertures formed in the edge part of the valve body whereby the edge part of the valve is provided with a channel, from which channel there is at least one aperture which opens into the space between the walls of the valve body, into a part of the space located opposite in relation to the actuator, and in which channel there is at least one inlet aperture to which the medium is conducted along a passage.

26. The method according to claim 25, wherein the cleaning medium is delivered via the passage, the channel and the aperture in the channel into the space between the walls of the valve body when the closing member of the valve is moved from the second position to the first position or when the closing member of the valve is moved from the first position to the second position.

27. The method according to claim 11, wherein delivering the cleaning medium comprises,
   delivering the cleaning medium via a first medium passage into the space between the walls of the valve body and via one second medium passage into the space between the walls of the valve body; and
   delivering the cleaning medium via the first medium passage into the space between the walls of the valve body when the closing member of the valve is moved from the first position to the second position and via the second medium passage when the closing member is moved from the second position to the first position.

28. The method according to claim 27, wherein an operating medium of the closing member is used as the cleaning medium.

29. The method according to claim 28, wherein the operating medium of the actuator is conducted from the actuator via the first medium passage or the second medium passage into the space between the walls of the valve body.

* * * * *